Inventor:
Georg Schlapp
Friedrich W. Sallwey
Paul Kohl
By Bailey, Stephens & Huettig
ATTORNEYS

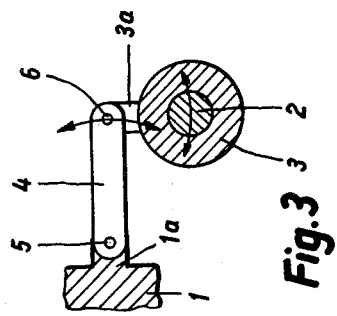
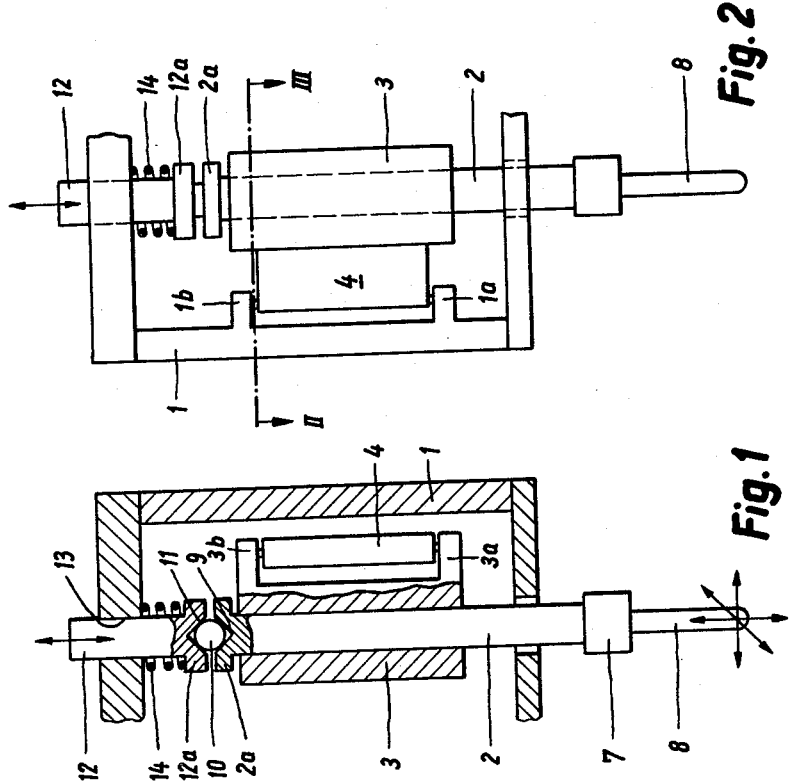

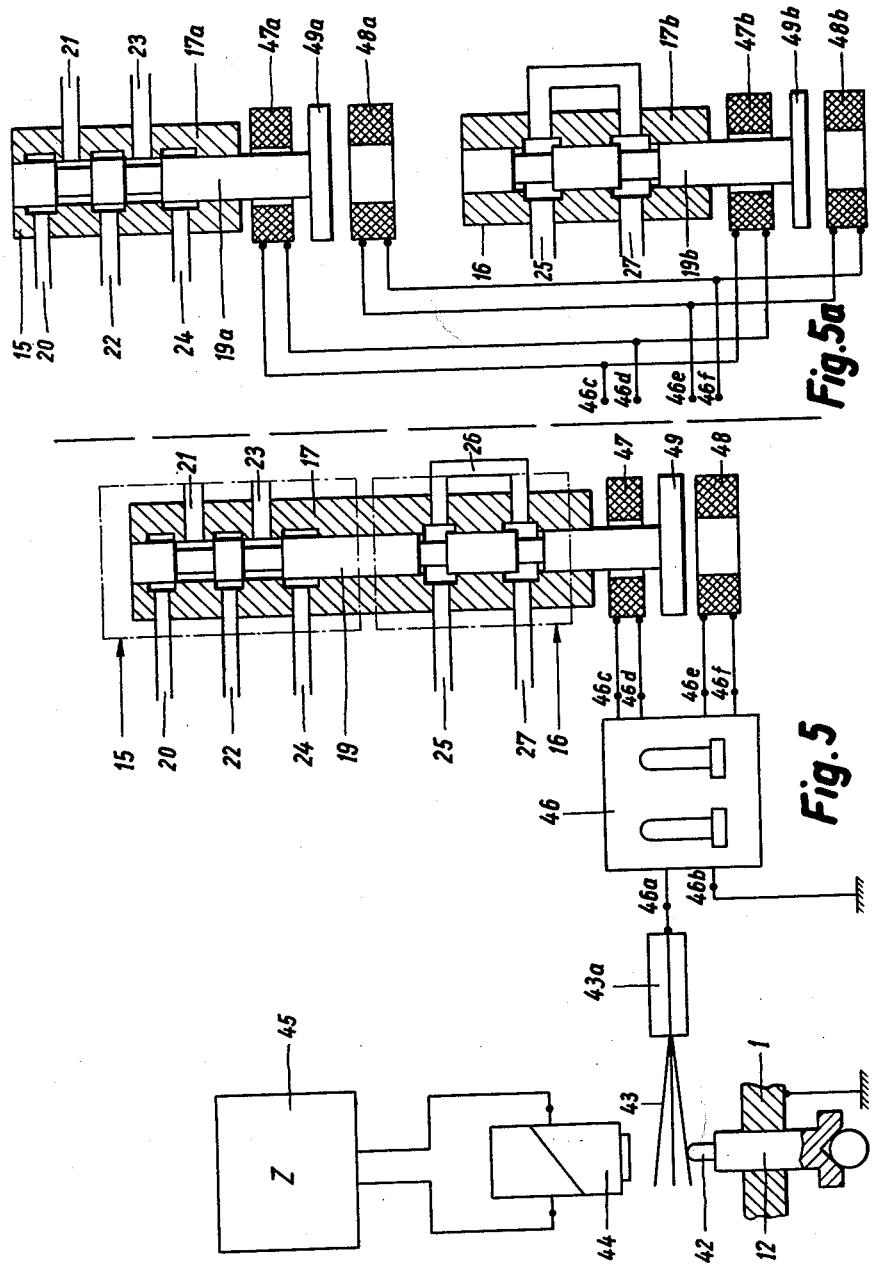

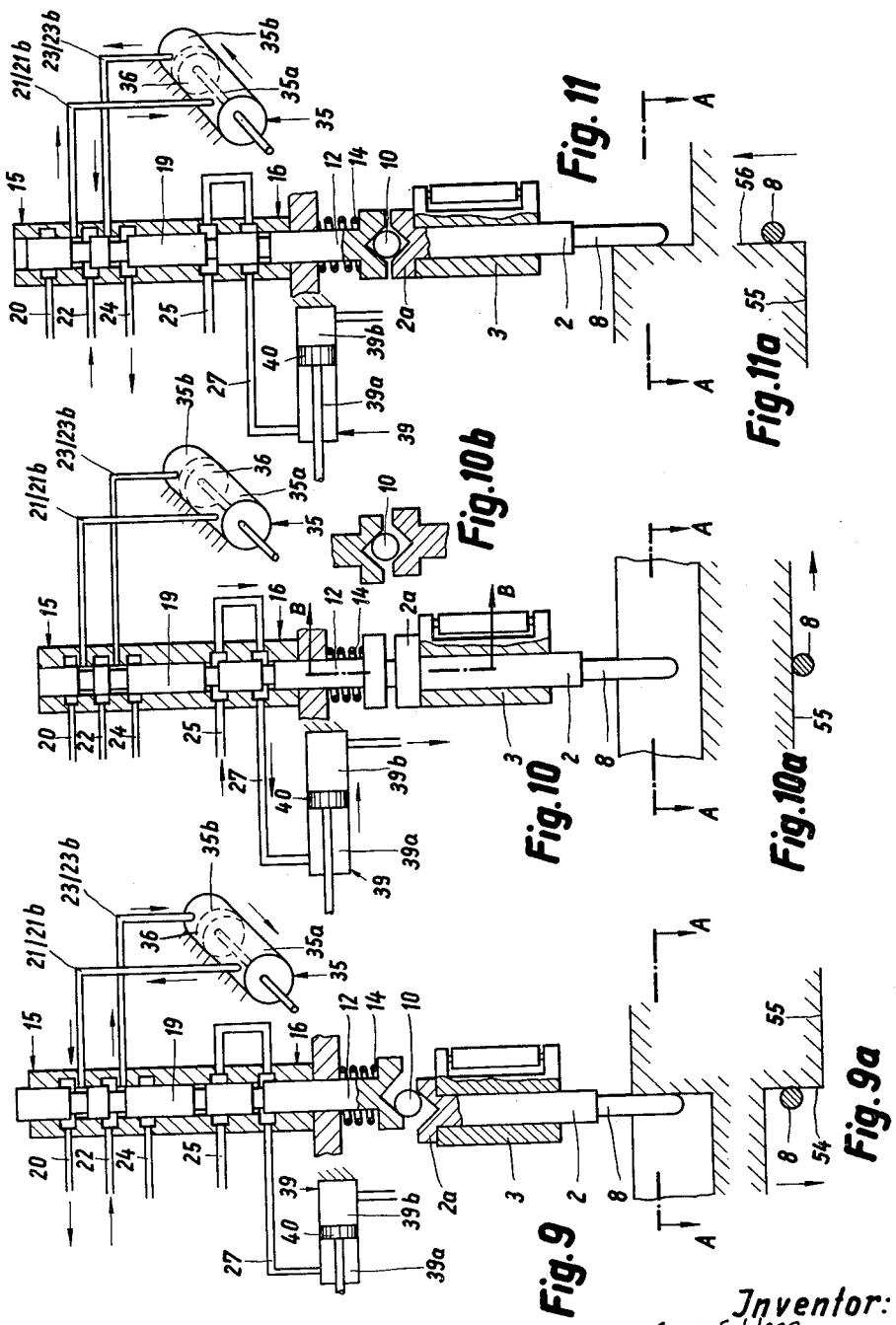

July 21, 1964
G. SCHLAPP ETAL
3,141,379
AUTOMATIC TRACING MECHANISM FOR MACHINE TOOLS
Filed Aug. 14, 1961
9 Sheets-Sheet 6
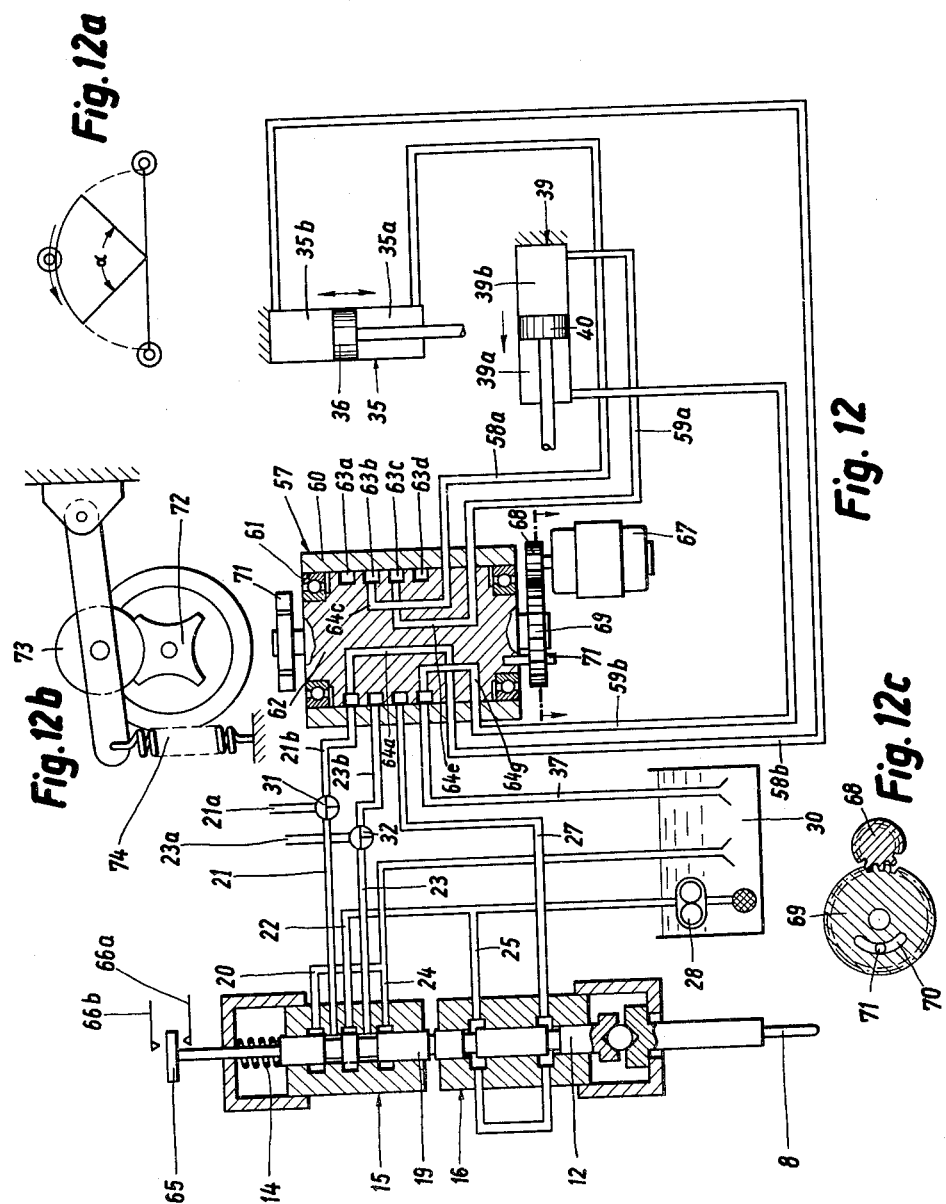
Inventor:
Georg Schlapp
Friedrich W. Sallwey
Paul Kohl
By Bailey, Stephens & Huettig
Attorneys July 21, 1964     G. SCHLAPP ETAL     3,141,379
AUTOMATIC TRACING MECHANISM FOR MACHINE TOOLS
Filed Aug. 14, 1961     9 Sheets-Sheet 7

*Inventor:*
Georg Schlapp
Friedrich W. Sallwey
Paul Kohl
By Bailey, Stephens & Huettig
ATTORNEYS

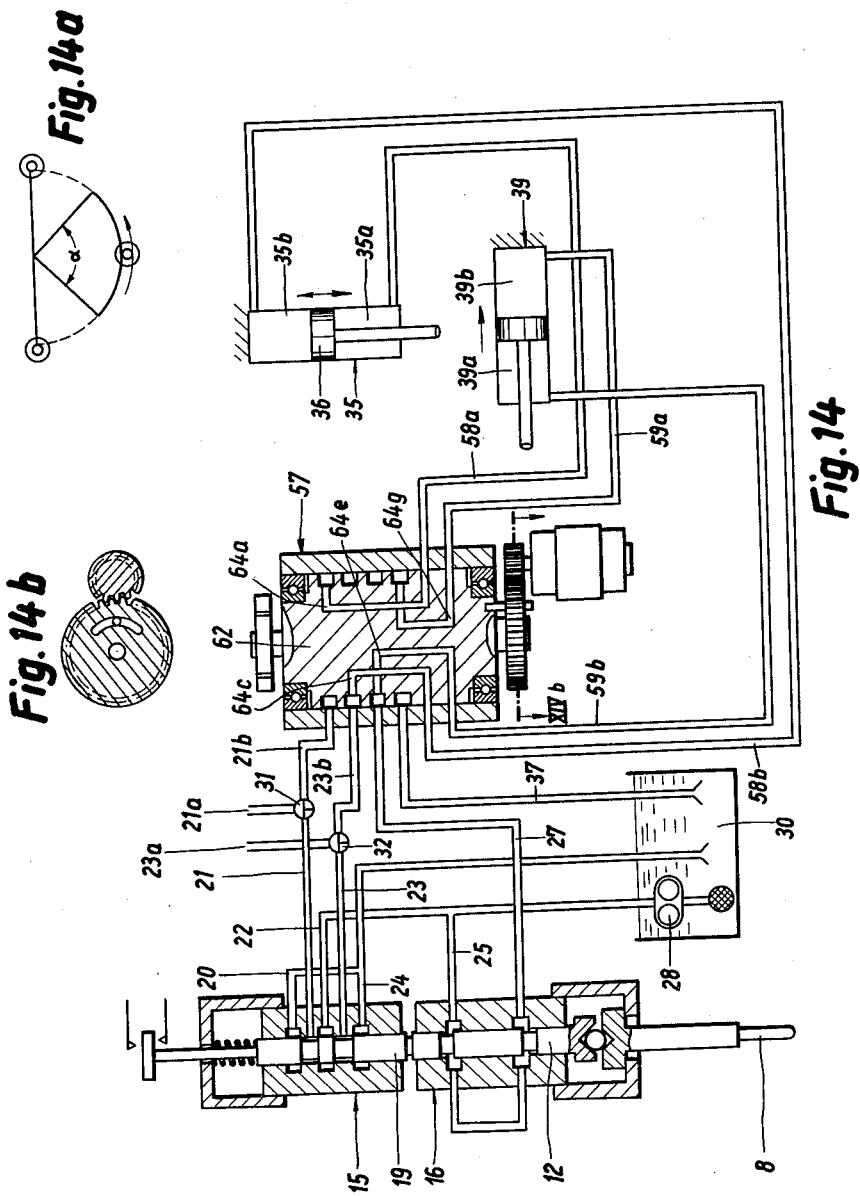

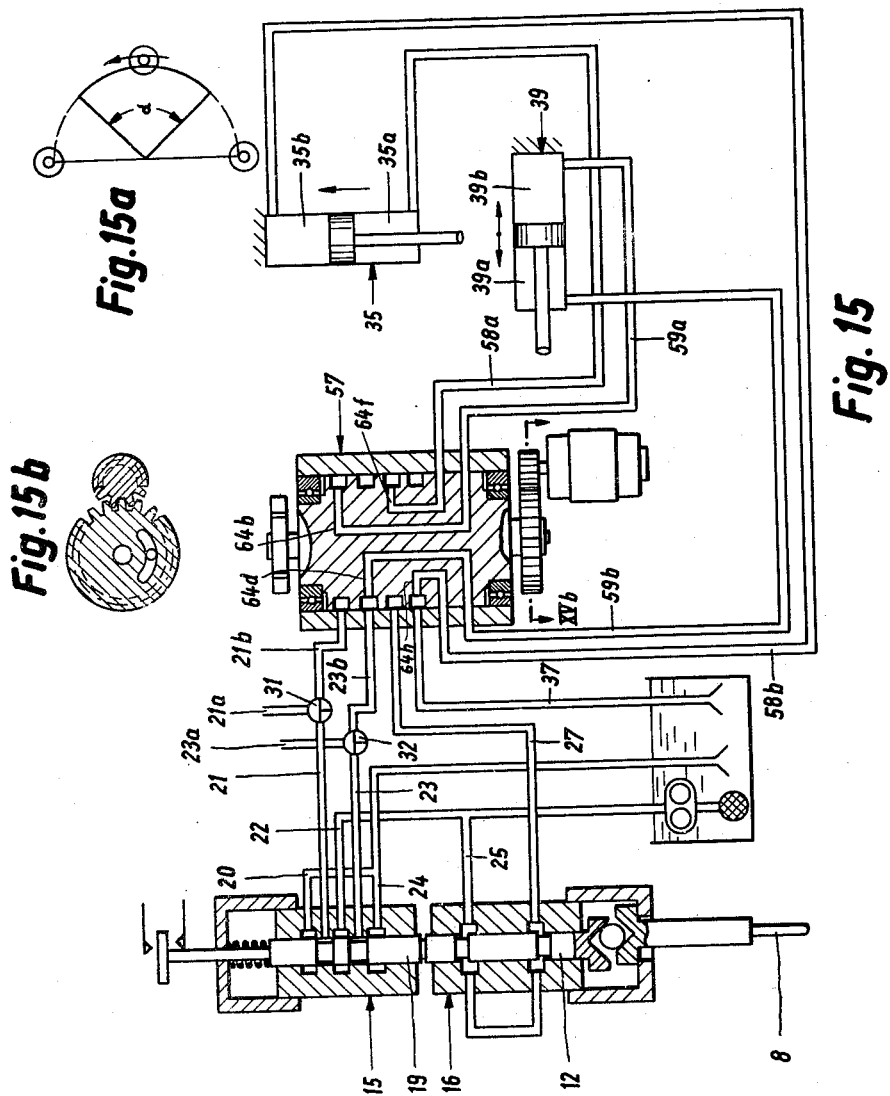

United States Patent Office 3,141,379
Patented July 21, 1964

3,141,379
AUTOMATIC TRACING MECHANISM FOR MACHINE TOOLS
Georg Schlapp, Friedrich W. Sallwey, and Paul Kohl, Langen, Hesse, Germany, assignors to Nassovia Werkzeugmaschinenfabrik G.m.b.H., Langen, Hesse, Germany, a company of Germany
Filed Aug. 14, 1961, Ser. No. 131,377
Claims priority, application Germany Aug. 25, 1960
10 Claims. (Cl. 90—62)

The present invention relates to an automatic tracing mechanism for machine tools, and particularly for duplicating milling machines or profilers in which the tool feed in two axial directions is controlled hydraulically by means of the tracing mechanism while the movement of the tool in a third axial direction is carried out independently of the tracing mechanism.

It is the principal object of the invention to provide a tracing mechanism of the type as above described in which the movements of the tracer in any direction are converted into a one-dimensional movement of a control element, for example, by means of a ball which is disposed between two opposite conical recesses in the tracing shaft and the control element, so as to actuate suitable control means in such a manner that the feed of the tool slide of the machine may be automatically controlled in a very simple manner and with the greatest possible accuracy for carrying out 180° straight-milling operations as well as 360° contour milling operations.

According to the invention, this object is attained by the provision of a reversing valve which is operated either directly or indirectly by the control element to control the supply of a pressure medium to two work chambers which are effective in opposite directions to each other for producing the feed of the tool in one of the directions which is controllable by the tracer, and by the combination of this reversing valve with a reversible cutoff valve for controlling the supply of the pressure medium to a third work chamber for effecting the feed of the tool in the other axaial direction which is controllable by the tracer. The apparatus according to the invention is designed in such a manner that when the control element is in its central position, the cutoff valve is fully opened and the reversing valve is fully closed, while when the control element is displaced in any direction from its central position, the cutoff valve will be progressively opened to supply the pressure medium to the work chamber which is associated with the respective direction of the displacement.

Particular features of the invention consist in positively connecting the control element with a common valve spool for the reversing valve and the cutoff valve, or in providing it with an electric contact which is operatively associated with and acted upon by a leaf spring serving as a countercontact which is vibrated in the direction of the displacement so that the contact-making and breaking periods which are dependent upon the position of the control element alternately energize a pair of electromagnets by means of an electronic flipflop circuit for actuating the reversing valve and the cutoff valve. This arrangement maintains the movable valve members in a constant vibration about particular control positions and, since there is thus no static friction, they are therefore capable as soon as a sudden change in the energization of the magnets occurs to react practically without any delay. The effective pressure of the pressure medium for operating the hydraulic control may also be considerably increased, and it is possible to convert very small deflecting movements of the tracer into very large valve movements whereby the duplicating accuracy will be greatly increased.

According to another feature of the invention which is applicable to an electromagnetic operation of the mentioned reversing valve and cutoff valve, these valves may be designed as separate elements and each valve may be operated by a separate pair of magnets with both pairs being connected in parallel. By this design it is possible to adjust the valves more easily individually and in their relation to each other.

In order to permit a contour milling within a range of 360°, a further feature of the invention provides that the control of the third work chamber by means of the cutoff valve is exchangeable for the control of a fourth work chamber which is oppositely effective thereto and communicates with an area without pressure.

According to a preferred feature of the invention, the association of the four work chambers with the reversing valve, the cutoff valve, and the pressureless area may be periodically reversed. This is attainable according to the invention by an additional valve arrangement which is controllable by the deflection of the tracer and which is preferably designed in the form of a rotary valve which consists of a housing with a cylindrical bore into which the pressure feed lines terminate which come from the reversing valve and the cutoff valve, as well as the connecting lines which lead to the work cylinders, and a pressureless return line which preferably leads to a tank. The rotary valve further contains connecting conduits for at least four different valve positions which differ from each other in accordance with the periodic reversal between the pressure feed lines and the pressureless return line. This rotary valve is automatically reversed when the deflection of a tracer falls off below a certain small value and when a greater deflection of the tracer is being exceeded, and the reversal of the rotary valve is carried out preferably by electromagnetic or electromotoric means in association with electrical contacts which are actuated by the control element or the servo piston of the reversing valve and/or of the cutoff valve.

The aforementioned as well as additional objects, features, and advantages of the invention will become more clearly apparent from the following detailed description thereof which is to be read with reference to the accompanying drawings, in which—

FIGURE 1 shows a cross-sectional side view of a tracer according to the invention:

FIGURE 2 shows a side view of the tracer according to FIGURE 1 but turned at an angle of 90° thereto;

FIGURE 3 shows a cross section taken along line III—III of FIGURE 2;

FIGURE 5 shows a diagram of a valve arrangement similar to that of FIGURE 4 but with an indirect actuation of the valves by means of an electromagnetic servo arrangement;

FIGURE 5a shows a valve arrangement similar to that according to FIGURE 5, but with two mechanically separate valves;

Figure 4:
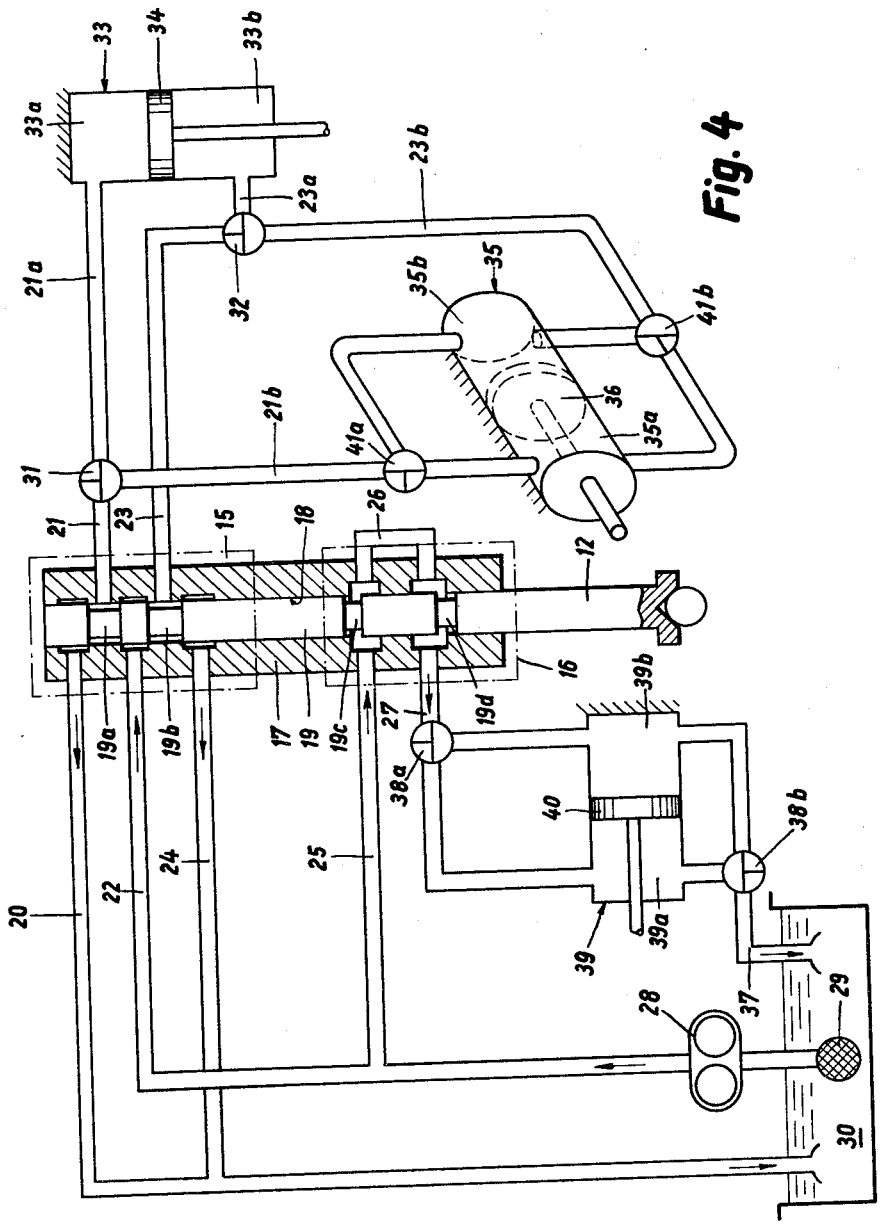
FIGURE 4 shows a diagram of a valve arrangement which is directly actuated by the control element, and a diagrammatic illustration of the hydraulic operation of the tool slides.
Figure 8:
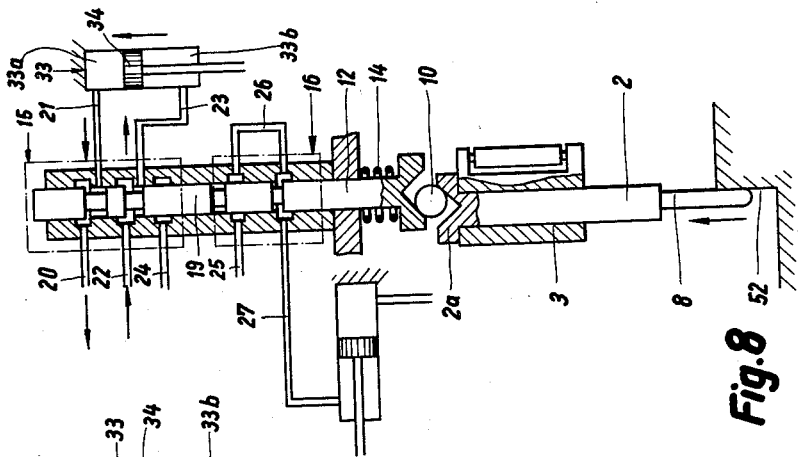
Figure 7:
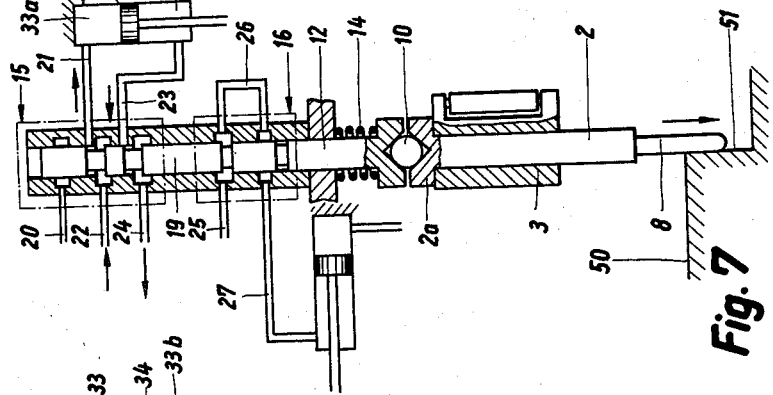
Figure 6:
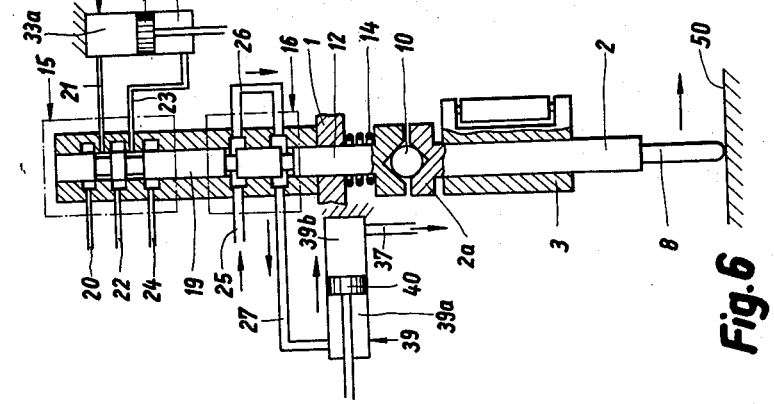

FIGURES 6, 7, and 8 show the tracing mechanism with directly actuated valves according to FIGURE 4 in different operating positions during a straight-milling operation;

FIGURES 9, 10, and 11 show the tracing mechanism with directly actuated valves according to FIGURE 4 in different operating positions during a contour milling operation.

FIGURES 9a, 10a, and 11a show cross sections of the tracing pin and the pattern taken along lines A—A' of FIGURES 9, 10, and 11, respectively;

FIGURE 10b shows a longitudinal section of a part of the tracing mechanism taken along line B—B' of FIGURE 10;

FIGURE 12 shows a diagram similar to that according to FIGURE 4 together with a quadrant valve for 360° contour milling work which is connected into the hydraulic line system;

FIGURE 12a shows an illustration of the tracing range in accordance with the position of the quadrant valve as shown in FIGURE 12, and it also indicates diagrammatically the deflection of the tracer relative to a control element which is movable only in its axial direction;

FIGURE 12b shows a plan view of the quadrant valve according to FIGURE 12 together with an arresting device;

FIGURE 12c shows a cross section of the driving gears of the quadrant valve, taken along line XIIc—XIIc of FIGURE 12;

FIGURES 13 to 15 show diagrams similar to that according to FIGURE 12 and illustrate the quadrant valve in different operating positons;

FIGURES 13a to 15a show illustrations similar to FIGURE 12a of the tracing range in accordance with the positions of the quadrant valve as shown in FIGURES 13 to 15; while FIGURES 13b to 15b show cross sections of the driving gears of the quadrant valve, taken along lines XIIIb—XIIIb, XIV—XIV, and XVb—XVb of FIGURES 13 to 15, respectively.

As illustrated particularly in FIGURES 1 and 2 of the drawings, a housing 1 which is rigidly secured to the tool support, not shown, for example, of a duplicating milling machine or profiler, and which therefore follows all of the movements of such a tool support, contains a tracer shaft 2 which is mounted in a bushing 3 so as to be slidable in the axail direction. This bushing 3 is provided with a pair of lugs 3a and 3b on which by means of a pivot pin 6 a solid, distortion-free intermediate lever 4 is pivotably connected which extends substantially at a right angle to lugs 3a and 3b and is, in turn, pivotably connected by a pivot pin 5 on a pair of lugs 1a and 1b on housing 1. This double pivotable connection of bushing 3 by means of pivot pin 5, lever 4, and pivot pin 6 permits bushing 3 to be pivoted horizontally in any direction parallel to housing 1. Since the tracer shaft 2 is also mounted in bushing 3 so as to be slidable in the vertical direction, it can carry out any desired movements parallel to housing 1.

The lower end of the tracer shaft 2 carries a tracing pin 8 which is clamped thereto, for example, by a chuck 7. The upper end of tracer shaft 2 is provided with a flange 2a which during the downward movement of this shaft can rest upon the upper edge of bushing 3 and will thereby limit the vertical downward movement of the tracer shaft.

The upper end surface of tracer shaft 2 is provided with a conical recess 9 in which slightly less than one half of a ball 10 is inserted, while the other half of ball 10 engages into a conical recess 11 in a control element 12 in the form of a shaft which extends coaxially to tracer shaft 2 and is mounted in a bore 13 in the cover of housing 1 so as to be slidable in the axial direction. By means of a compression spring 14 which is mounted between the cover of housing 1 and a flange 12a on the lower end of control shaft 12, this shaft is held in constant engagement with ball 10. As will be subsequently described in detail, this control shaft 12 is adapted to control the operation of a reversing valve 15 and a cutoff valve 16, as shown in FIGURES 4, 5, and 5a, for controlling the hydraulic drive of the longitudinal, transverse, and vertical slides of the tool support, respectively, and thus also the drive of the tracing mechanism.

FIGURE 4 shows an arrangement for directly controlling the functions of the reversing valve 15 and the cutoff valve 16. For this direct control, the valves consist of a common valve housing 17 which has a longitudinal bore 18 in which a valve spool 19 is slidable which is integral with control shaft 12. Valve spool 19 is provided with annular recesses 19a, 19b, 19c and 19d which control the extent of the respective connections between the pressure lines 20, 21, 22, 23, 24, 25, 26, and 27 which terminate in radial directions into the longitudinal bore 18 and lead to the source of hydraulic fluid and to the feeding devices for the machine slides, respectively. The hydraulic fluid is drawn by a pump 28 from a pressureless tank 30 through a filter 29 and it is then supplied to valves 15 and 16 through the feed lines 22 and 25.

The reversing valve 15 and the cutoff valve 16 are connected to the hydraulic system of the machine tool in the following manner:

When valve spool 19 is in its central position in valve housing 17, the control surfaces intermediate the annular recesses 19a and 19b close all openings of lines 20 to 24 terminating into the upper part of valve housing 17 relative to each other so that the reversing valve 15 is then closed. When valve spool 19 is moved downwardly, feed line 22 is connected to an increasing extent through the annular recesses 19a with control line 21, while a second control line 23 is connected to the same extent through the annular recess 19b with a pressureless return line 24. When the valve spool 19 is moved upwardly, feed line 22 is connected to an increasing extent through the annular recess 19b with the control line 23, while the control line 21 is connected through the annular recess 19a with the pressureless return line 20. Both pressureless return lines 20 and 24 lead to tank 30. Control lines 21 and 23 are adapted to be selectively connected by switch valves 31 and 32 to the work chambers 33a and 33b of a vertical cylinder 33 containing a work piston 34 for effecting the vertical feed of the tool support of the machine tool through connecting lines 21a and 23a, or to the work chambers 35a and 35b of a transverse cylinder 35 containing a work piston 36 for effecting the transverse feed of the tool support via connecting lines 21b and 23b. Two further switch valves 41a and 41b permit the connection of connecting lines 21a and 23b to work chambers 35a and 35b of the transverse cylinder 35 to be reversed.

When valve spool 19 is in its central position, the hydraulic fluid is supplied from feed line 25 through the annular recess 19c of the cutoff valve 16 into a channel 26 and then through the annular recess 19d to a control line 27. Thus, when valve spool 19 is shifted either upwardly or downwardly from its central position, the connection between feed line 25 and control line 27 will be progressively reduced and finally interrupted entirely. From the control line 27 the hydraulic fluid passes through a switch valve 38a to one of the two work chambers 39a or 39b of a longitudinal cylinder 39 which contains a work piston 40 for effecting the longitudinal feed of the tool support. The respective work chamber of the longitudinal cylinder 39 which is not connected with the control line 27 is connected by a second switch valve 38b with a pressureless return line 37 which leads to tank 30. The two switch valves 38a and 38b are mechanically connected to each other, and during a straight-milling operation they are actuated by a conventional straight-milling control device and during a 360° contour-milling operation, as later described in detail, they are actuated together with the switch valves 41a and 41b for the transverse cylinder 36 in accordance with the tracer movement.

FIGURE 5 illustrates an arrangement for indirectly controlling the operation of the valves 15 and 16, which are provided with a common valve spool 19, by means of an electromagnetic servo arrangement. The control shaft 12 carries in this case at its upper end an electric contact 42 which projects into the range of oscillation of a leaf spring 43 which serves as a countercontact and oscillates in the direction of movement of control shaft 12.

Leaf spring 43 is secured at one end within an insulated holder 43a. Above spring 43 and coaxially to control shaft 12 an electromagnet 44 is mounted which is energized by a vibrator converter 44 with pulsating current, for example, of a frequency of 200 cycles, which is applied upon leaf spring 43. Of course, the electromagnet may also be energized with alternating current which may be produced, for example, by a generator or a frequency converter. Contact 42 of control shaft 12 is grounded. The end of lead spring 43 which is clamped in the holder 43a is electrically connected to one inlet terminal 46a of a conventional electronic control apparatus 46, the other inlet terminal 46b of which is connected to ground and is therefore electrically connected to contact 42 of control shaft 12. The electronic control apparatus 46 contains two tubes which are connected according to the known flipflop circuit and energize a solenoid winding 47 through the outlet terminals 46c and 46d when leaf spring 43 engages with contact 42 and energize a second solenoid winding 48 through the outlet terminals 46e when leaf spring 43 and contact 42 are interrupted from each other. Between the two solenoid windings 47 and 48 an armature 49 is mounted so as to be movable in the axial direction. This armature 49 is secured to one end of valve spool 19 of the valve arrangement 15 and 16, as described with reference to FIGURE 4, and it is adapted to move valve spool 19 in accordance with the excitation of the solenoid windings 47 and 48.

The oscillations of lead spring 43 which are forced thereon by the electromagnet 44 result in a very quick succession of contact engagements between leaf spring 43 and contact 42. The length of time of each engagement depends upon the extent which control shaft 12 projects into the area of oscillation of leaf spring 43. If control shaft 12 is moved downwardly as viewed in FIGURE 5, the contact-making period within each oscillation period of leaf spring 43 decreases, while the contact-breaking period increases until finally the contacts no longer engage at all (lower end value). If control shaft 12 is moved upwardly, the contact-making period increases, while the contact-breaking period decreases until finally the contacts are in constant engagement with each other so that the oscillation of leaf spring 43 is interrupted (upper end value).

The solenoid windings 47 and 48 are alternately energized in accordance with the ratio between the contact making and breaking perdiods between contact 42 and leaf spring 43 which are dependent upon the respective position of control shaft 12, and they are thus energized with a frequency which is equal to the frequency of oscillation of leaf spring 43. Since the armature 49 and valve spool 19 are, however, incapable of following such a high frequency, the armature will—while slightly vibrating—assume an intermediate position which corresponds to the ratio of the energizing periods of the solenoid windings 47 and 48. In this manner it is possible to transmit each position of control shaft 12 to valves 15 and 16 even though the control shaft itself does not have to exert any force to operate the valves. This servo arrangement therefore permits at a small amplitude of oscillation of leaf spring 43 to attain a very sensitive transmission of the movements of control shaft 12 which may be transformed into axial movements of valve spool 19 of any desired size. The sensitivity of the tracing mechanism is therefore considerably increased and the duplicating accuracy is improved.

Instead of providing the two valves 15 and 16 within a common housing 17, they may also be arranged in separate housings 17a and 17b, as illustrated in FIGURE 5a, each with a separate pair of solenoid windings 47a, 48a, and 47b, 48b, respectively. This form of construction has the advantage that the valve spools 19a and 19b can be made so as to be adjustable independently of each other, for example, by making the armatures 49a and 49b adjustable in the axial direction relative to the valve spools 19a and 19b.

The operation of the duplicating control mechanism according to the invention with a direct control of valves 15 and 16 will now be described with reference to FIGURES 6 to 11. The operation with the indirect control of the valves, as previously described, is in effect analogous hereto.

For a straight-milling operation according to FIGURES 6 to 8, valves 31 and 32, as shown in FIGURE 4, are set so that the vertical cylinder 33 communicates through the connecting lines 21a and 23a with the control lines 21 and 23, while the transverse cylinder 35 containing the work piston 36 is shut off. The infeed adjustment in the transverse direction may be carried out by a conventional infeed adjustment device. The switch valves 38a and 38b are used for setting the direction in which the longitudinal feed is to proceed. Before the tracing pin 8 is applied upon the pattern to be duplicated, valve spool 19 is in its lower end position, as shown in FIGURE 7 since control shaft 12 is pressed downwardly by spring 14 so that the tracer shaft 2 rests with its flange 2a on bushing 3. In this position, the connection between channel 26 and control line 27 is interrupted by the cutoff valve 16, while the reversing valve connects the control line 21 with the feed line 22. The pressure fluid therefore passes into the upper work chamber 33a in the vertical cylinder 33 so that the tool support and the tracing mechanism start to move in a vertical direction. The pressure fluid which is forced out of the lower work chamber 33b of the vertical cylinder 33 then flows through the control line 23, the annular recess 19b in valve spool 19, and the return line 24 into tank 30.

As soon as tracing pin 8 during its downward movement engages upon a horizontal surface 50 of the pattern, it is moved upwardly relative to housing 1 and, through the tracer shaft 2 and ball 10, it lifts the control valve 12 and thereby moves valve spool 19 to its central position, as shown in FIGURE 6. The connection between feedline 22 and control line 21 is thereby interrupted and the downward movement of the tool support and of housing 1 is stopped. At the same time, channel 26 is connected with control line 27 so that the pressure fluid can flow from feed line 25 through channel 26 into the control line 27 and from the latter into one or the other work chambers 39a or 39b of the longitudinal cylinder 39, depending upon the setting of switch valves 38a and 38b, so that the tool support and the tracing mechanism will carry out a longitudinal feeding movement.

If the tracing pin while scanning the pattern comes to a descending wall, for example, a vertical wall 51, as shown in FIGURE 7, it is moved downwardly under the action of spring 14 and takes along the servo piston 12 in the same manner as prior to its engagement with the horizontal surface 50 of the pattern, whereby valve spool 19 interrupts the longitudinal feed of the work piston 40 and starts the vertical downward movement of work piston 34 in the vertical cylinder 33 as the result of the connection of feed line 22 with the control line 21 until the tracing pin again abuts upon a horizontal surface and the valve mechanisms is changed over to the longitudinal feed in the same manner as previously described with reference to the first engagement of the tracing pin upon the surface 50 of the pattern.

If the tracing pin hits against an ascending wall, for example, a vertical wall 52, as shown in FIGURE 8, it will be arrested relative to housing 1 which continues to move in the direction of the longitudinal feed. This is possible due to the fact that tracing shaft 2, as previously described with reference to FIGURES 1 to 3 is mounted so as to be pivotable in all parallel directions. Tracing shaft 2 is therefore able to shift laterally relative to control shaft 12 so that ball 10 will be forced out of its normal central position and thereby shift the control shaft 12 upwardly against the action of spring 14. Valve spool 19 is thereby lifted to its upper end position and shuts off the connection in cutoff valve 16 between feed line 25 and channel 26 so that the longitudinal feed will be discontinued. At the same time, control line 23 is connected in reversing valve 15 with feed line 22 and control line 21 with return line 20, whereby work piston 24 in the vertical cylinder 33 is moved upwardly so that the tool support with the tracing mechanism is also moved upwardly. When tracing pin 8 reaches the upper edge of the vertical wall 52, it is returned by the action of spring 14 upon ball 10 to its normal position, whereby the upward movement is interrupted and the longitudinal movement is again started (FIGURE 6).

If valve spool 19 is either raised or lowered in such a manner that the same quantity of pressure fluid flows through reversing valve 15 as through cutoff valve 16, the feed of the tool will occur at an angle of exactly 45° upwardly or downwardly. However, since the two valves 15 and 16 always operate equally but inversely to each other in accordance with the movement of control shaft 12, so that the more the reversing valve 15 is closed, the more the cutoff valve 16 is opened or vice versa, even curved edges of the pattern may be duplicated continuously in any direction.

The same effect of the tracing mechanism as above described with a one-piece control element 12 and a valve spool 19 is also attained with the embodiment of the invention according to FIGURES 5 and 5a in which valve spool 19, according to FIGURE 5 or the separate valve spools 19a and 19b according to FIGURE 5a are moved to the required positions by an electromagnetic operation in association with an electronic control unit.

For contour milling, as illustrated in FIGURES 9 to 11, the switch valves 31 and 32 according to FIGURE 4 are adjusted so that work chambers 35a and 35b of the transverse cylinder 35 are connected through lines 21b and 23b with the control lines 21 and 23, while lines 21a and 23b are shut off from the vertical cylinder 33. The vertical infeed occurring in steps is carried out by a conventional vertical infeed adjustment device.

Regarding the switch valves 38a and 38b and 41a and 41b it will be first assumed that they are in the position as illustrated in FIGURE 4, so that connecting line 27 is connected through switch valve 38a with the left work chamber 39a of the longitudinal cylinder, return line 37 through switch valve 38b with the right work chamber 39b of the longitudinal cylinder, connecting line 21/21b with the front work chamber 35a of the transverse cylinder, and connecting line 23/23b with the rear work chamber 35b of the transverse cylinder. The combination of all four of these switch valves into one quadrant valve and the control thereof will be described further below.

It is further assumed that tracting pin 8 is in its original position at the left side of the pattern as shown in FIGURES 9 to 11. Similarly as previously described with reference to a straight-milling operation, as long as tracing pin 8 is not in engagement with the pattern, spring 14 depresses control shaft 12 and, through ball 10 which is disposed centrally in recesses 9 and 11, it also depresses the tracer shaft 2 with tracing pin 8 until flange 2a engages with the upper edge of bushing 3, so that the tracing mechanism is in the position as illustrated in FIGURES 7 and 11. Valve spool 19 is then in its lower end position and closes the cut-off valve 16 so that the supply of pressure fluid to the longitudinal cylinder 39 is shut off and work piston 40 is stopped. At the same time, reversing valve 15 opens and effects a movement of work piston 36 in the transverse cylinder 35 toward the rear, as viewed in FIGURE 11, as long as the tracing pin is in engagement with the pattern, for example, with a vertical wall extending transverse to the automatic feed, and is thereby deflected in the direction opposite to the direction of feed. By this movement ball 10 is forced out of its central position and, since flange 2a of control shaft 2 continues to rest on bushing 3, it lifts the control shaft and thus also the valve spool 19 up to the middle position, as shown in FIGURE 10, whereby the transverse feed toward the rear is stopped and a longitudinal feed toward the right is started by means of the work piston 40 in the longitudinal cylinder 39.

If during the longitudinal feed the tracing pin 8 hits against a vertical pattern wall 54 extending transverse to this direction, as illustrated in FIGURES 9 and 9a, it will be still more strongly deflected, and, through ball 10, push the valve spool into its upper end position, whereby the cutoff valve 16 interrupts the longitudinal feed and the reversing valve 15 starts a transverse movement of piston 36 in the transverse cylinder 35 toward the front, as seen in FIGURE 9.

If tracing pin 8 in the course of the transverse movement toward the front reaches the end of the transverse pattern wall 54 which joins, for example, with a vertical pattern wall 55 extending in the longitudinal direction, the deflection of the tracing pin decreases because of the action of spring 14 through ball 10 so that the latter can move back in the direction toward its central position until valve spool 19 has again reached its middle position, as shown in FIGURE 10. In this central position, valve spool 19 shuts off the supply of pressure fluid to the transverse cylinder 35 by means of the reversing valve 15 so that the transverse feed toward the front is stopped, while at the same time the pressure through the open cutoff valve 16 to the left part of the longitudinal cylinder 39 and thereby starts a longitudinal feed of work piston 40 toward the right. A further movement of ball 10 to its central position is thus prevented so that it remains in a position about half-way from its previous point of displacement during the transverse feed toward the front.

If the tracing pin then reaches the end of the longitudinal wall 55 which joins, for example, with a transverse wall 56 toward the rear, as seen in FIGURE 11, the deflection of the tracing pin will decrease to zero after passing over the corner of the pattern whereby ball 10 together with the tracing shaft is returned by spring 14 to its central position which, in turn, results in a lowering of valve spool 19 to its lower end position, as shown in FIGURE 11, in which, as previously described, the longitudinal feed is interrupted and the transverse feed toward the rear is started.

From the above description it is evident that, when the tracing pin engages with a wall which extends obliquely between the longitudinal direction and the one of the two transverse directions, it will assume intermediate position between the middle position and one of the two end positions of control shaft 12, so that within an angular range of 180° any desired tangential direction of a pattern edge may be traced and duplicated on the workpiece.

Since, after passing along the pattern in the mentioned manner around the angle of 180°, the control shaft 12 has reached its lowest position, tracing pin 8 would at a further curvature or angle on the pattern move away from it tangentially. In order to prevent this and to insure a complete tracing of the pattern contours around 360°, it is necessary to change the position of switch valves 38a, 38b, 41a, and 41b. According to another feature of the invention, this is attained by combining the different switch valves into one compound valve, as illustrated for a direct control by FIGURES 12 to 15.

FIGURE 12 shows the arrangement of a quadrant valve 57 between the control lines 21/21b, 23/23b, and 27 coming from the reversing valve, valve 15, and the cutoff valve 16, the pressureless return line 37, and the connecting lines 58a, 58b, 59a and 59b leading to the work chambers 35a, 35b, 39a, and 39b, respectively. Those parts in FIGURE 12, the functions of which correspond to those as illustrated in FIGURE 4 are identified by the same reference numerals.

The quadrant valve 57 essentially consists of a housing 60 which has a cylindrical bore 61 in which a cylindrical valve member 62 is rotatably mounted but so as to have tightly sealing fit therein. The upper part of housing 60 contains the ends of the three control lines 21b, 23b, and 27 and of the pressureless return line 37 which terminate into bore 61 and are spaced axially from each other. The lower part of housing 60 and bore 61 contains the ends of the four connecting lines 58a, 58b, 59a, and 59b which are arranged in pairs at diametrically opposite points.

The upper part of valve member 62 is provided with four annular peripheral recesses 63a, 63b, 63c, and 63d which are spaced from each other and are disposed in positions in alignment with the ends of control lines 21b, 23b, 27 and return line 37, respectively, so that in the assembled condition of the quadrant valve each annular recess in valve member 62 communicates continuously with one control line or the return line independently of the rotary position of valve member 62 relative to housing 60. Valve member 62 is provided at the inside with eight separate channels 64a to 64h, as also shown in FIGURES 13 to 15, which are connected in pairs to each annular recess 63a, 63b, 63c, and 63d and the first group of which 64a, 64c, 64e, and 64g emerges in the form of opposite pairs within one axial plane at the lower part of the valve member, while the second group 64b, 64d, 64f, and 64h terminates also in the form of opposite pairs within a second axial plane which is disposed at a right angle to the first axial plane. The outlet points of the channels are disposed in the same axial positions as the respective ends of the connecting lines 58a, 58b, 59a, and 59b so that, when valve member 62 is turned to a first position as shown in FIGURE 12, or to a third position at 180° to the first position, as shown in FIGURE 14, the longitudinal cylinder 39 will be connected with the cutoff valve 16 and the transverse cylinder 35 with the reversing valve 15, while when valve member 62 is turned to a second position at 90° to the first position, as shown in FIGURE 13, or to a fourth position at 270° to the first position, as shown in FIGURE 15, the connections of the longitudinal and transverse cylinders to valves 15 and 16 are reversed relative to the first or third positions. The first rotary position of the valve member differs further from the third position and the second position from the fourth position by the fact that work chambers 35a and 35b—and inversely thereto the work chambers 39a and 39b—are connected with the control lines 21 and 23 coming from the reversing valve 15 or with the control line 27 coming from the cutoff valve 16 and with the return line 37, respectively. This valve arrangement thus permits at each quarter-turn of valve member 62 a reversal of the relative position of work chambers 35a, 39a, 35b, and 39b so that, for tracing the pattern and for cutting the workpiece, each position of valve member 62 is associated with a 180° range which is offset at 90° relative to the 180° range which is associated with the next rotary position. Thus, the transverse cylinder 35 and the longitudinal cylinder 39 may always be alternately controlled by the reversing valve 15 in two directions and the cutoff valve 16 in one direction.

Since one half of each of two adjacent 180° ranges overlap each other, it suffices if the tracing range for each position of the valve member is limited to 90° in accordance with the angle α in FIGURES 12a to 15a, that is, to a range of displacement of valve spool 10 between a lower position in which the reversing valve 15 and the cutoff valve 16 are equally opened by a one-quarter deflection of the tracer and an upper position in which the reversing valve 15 and the cutoff valve 16 are likewise equally opened by a three-quarter deflection of the tracer but in which the reversing valve 15 effect a feed of the piston in the respective cylinder in the opposite direction. This is preferably attained by a contactor 65 which is moved by the control shaft 12 or, at an indirect control, by the valve spool 19, and which together with control shaft 12 of value spool 19 is movable between two fixed contacts 66a and 66b. With tracer 8 falls short of carrying out a one-quarter deflection, contactor 65 together with contact 66a will close the circuit of a motor 67 so that the latter will rotate in one direction, while when tracer 8 exceeds a three-quarter deflection, contactor 65 together with contact 66b will close a second circuit of motor 67 so that the latter will rotate in the opposite direction.

The shaft of motor 67 carries a pinion 68 which is in mesh with a gear 69 which is freely rotatable on a shaft stub on valve member 62. This gear 69 is provided with an arcuate slot 70 which extends in the peripheral direction for a distance of approximately 90° and into which a pin 71 engages which is mounted in an eccentric position in the end surface of valve member 62. At its opposite end, valve member 62 carries a Maltese cross 72 with four arms into which a roller 73 engages which is movable substantially radially to the Maltese cross and is arrested in its engaged position by a spring 74. Valve member 62 is thus provided with four separate positions which are offset relative to each other at an angle of 90° so that the channels 64a to 64h may be connected in different relations with the connecting lines 58a, 58b, 59a, and 59b.

If by the engagement of contactor 65 with one of the fixed contacts 66a or 66b the motor 67 runs in one or the other direction, it first rotates through pinion 68 the gear 69 until pin 71 engages with the end of slot 70. At the further rotation of gear 69, pin 71 is taken along and thereby also turns the valve member 62 together with the Maltese cross 72. Roller 73 is then forced against the action of spring 74 out of its engagement with the Maltese cross 72 until it reaches the highest point on one of the arms of the cross, whereupon the direction of the torque which is exerted upon the Maltese cross by spring 74 through roller 73 is reversed so that, under the action of spring 74 and because of slot 70, the Maltese cross together with valve member 62 is suddenly moved to the next fixed position. Since the new position of the quadrant valve 57 corresponds to a different position of valves 15 and 16 for attaining the direction of feed of the tracer resulting from the valve reversal, the contactor 65 is again moved quickly away from the respective fixed contact 66a or 66b so that motor 67 is stopped. A delay in the opening of the contacts or a short continued rotation of the motor is of no importance because of the effect of the arcuate slot 70.

From the preceding description it will be evident that it is possible by the application of the quadrant valve 57 to trace the contours of any pattern of any desired shape and to duplicate them on the workpiece by means of the machine tool.

It is further apparent from the preceding description that the quadrant valve 57 may be arranged in the system of hydraulic lines in the same manner for an indirect control of valves 15 and 16 as for the direct control as described. It is in such as case desirable to move the contactor 65 by means of the value spool 19 or one of the value spools 19a or 19b similarly as shown in FIGURES 5 or 5a, respectively, since the movement of control shaft 12 may be too small to effect a reliable actuation of the contacts.

If the reversing valves 21a and 23a are set for a straight milling operation, the contactor 65 should be disconnected by suitable means from the control shaft 12 or the respective valve spool 19, 19a, or 19b, in order to prevent any reversing movements of the quadrant valve 67 which are undesirable for straight-milling and to attain the 180° tracing range on the pattern which is then required. The reversing valves 21a and 23a are then preferably connected to a suitable connecting mechanism whereby the contactor 65 is automatically disconnected when these valves are reversed. By a suitable adjustment of the quadrant valve before the duplicating work is started, it is easily possible to preset the horizontal feed in any of the four main directions. Furthermore, by reversing the quadrant valve 57 quickly twice in succession at the end of a straight milling course, it is possible to reverse the direction of the horizontal feed and at the same time to reset the infeed as the result of the first reversing position which only lasts for a brief period of time.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. An automatic tracing mechanism control means for milling machines for contour milling, and in which the tool feed is hydraulically controlled in a first and a second direction by the tracing mechanism and independently controlled in a third direction, and in which deflection of the tracing pin is transmitted through a ball joint to a control shaft movable only in the direction of the longitudinal axis of said shaft, the improvement comprising a first hydraulic piston for tool feed in one direction of the contour to be milled, a second hydraulic piston for tool feed in the other direction of the contour to be milled, reversing valve means actuatable by said shaft for supplying fluid pressure to either the first or the second hydraulic piston, cutoff valve means actuatable by said shaft for supplying fluid pressure to the other one of the first or second hydraulic piston, said shaft having a central position at which said reversing valve means is closed and said cutoff valve means is opened, switch valve means operative in four different combinations, said switch valve means cyclically interchanging the fluid pressure supply from said reversing valve means and said cutoff valve means to either one or the other of the first or the second hydraulic piston, respectively, when said switch valve means is operated, operating means for moving said switch valve means in either direction, and contact means actuatable by said shaft, said contact means actuating said operating means in one direction when said shaft is in its downward position, and in the other direction when said shaft is in its upward position.

2. An automatic tracing mechanism control means as in claim 1, said reversing valve means and said cutoff valve means having a valve housing, a valve spool in said housing, and said valve spool being common to said reversing valve and cutoff valve means and operated by said shaft.

3. An automatic tracing mechanism control means as in claim 1, further comprising a leaf spring adapted to electrically contact intermittently with said shaft, means for oscillating said spring into contact with said shaft, oppositely effective electric magnet means for moving said valve spool, and electronic flipflop circuit means joining said spring and magnet means for energizing said magnet means to move said valve spool as a function of the time said spring is in contact with said shaft.

4. An automatic tracing mechanism control means as in claim 1, further comprising manually operated switch valves coupled with said reversing valve means for making inoperative either of said first and second hydraulic pistons when tracing contours over an area of 360°.

5. An automatic tracing mechanism control means as in claim 1, said switch valve means comprising a housing having a cylindrical bore, pipe lines connecting said bore with said hydraulic pistons and a source of fluid pressure, a valve member rotatably mounted in said bore, and channel means in said valve member for connecting said pipe lines in at least four different combinations upon rotation of said valve member upon the periodic operation of the switch valve.

6. An automatic tracing mechanism control means as in claim 5, said means for periodically operating said switch valve comprising motor means for rotating said valve member, and contact means actuated by said control shaft for energizing said motor means when said servo-piston from its central position reaches halfway to one of its two possible limits of movement.

7. An automatic tracing mechanism control means as in claim 6, further comprising means associated with said motor means and said valve member for reversing the direction of rotation of said valve member.

8. An automatic tracing mechanism control means as in claim 7, said associated means including a Maltese cross element rotatable with said valve member, and a spring-loaded roller held in engagement with said element.

9. An automatic tracing mechanism control means as in claim 1, further comprising a tracing pin housing, and tracing pin supporting means in said housing for holding said tracing means pivotal horizontally in any direction parallel to said tracing pin housing.

10. An automatic tracing mechanism control means as in claim 9, said tracing pin supporting means comprising bushing means for slidably supporting said pin in the longitudinal direction of said pin, and double pivot lever means joining said bushing to said housing.

References Cited in the file of this patent

UNITED STATES PATENTS

| | | |
|---|---|---|
| 2,079,720 | Shaw | May 11, 1937 |
| 2,177,347 | Sedelmeyer et al. | Oct. 24, 1939 |
| 2,391,492 | Turchan et al. | Dec. 25, 1945 |
| 2,726,581 | Roehm | Dec. 13, 1955 |
| 2,841,356 | Glaser | July 1, 1958 |
| 2,872,148 | Humes | Feb. 3, 1959 |
| 2,891,384 | Moore | June 23, 1959 |
| 3,004,747 | Moore | Oct. 17, 1961 |